Oct. 19, 1937.    J. W. LEIGHTON    2,096,118
INDEPENDENT WHEEL SUSPENSION
Original Filed Nov. 20, 1933    2 Sheets-Sheet 1

Inventor.
John Wycliffe Leighton.

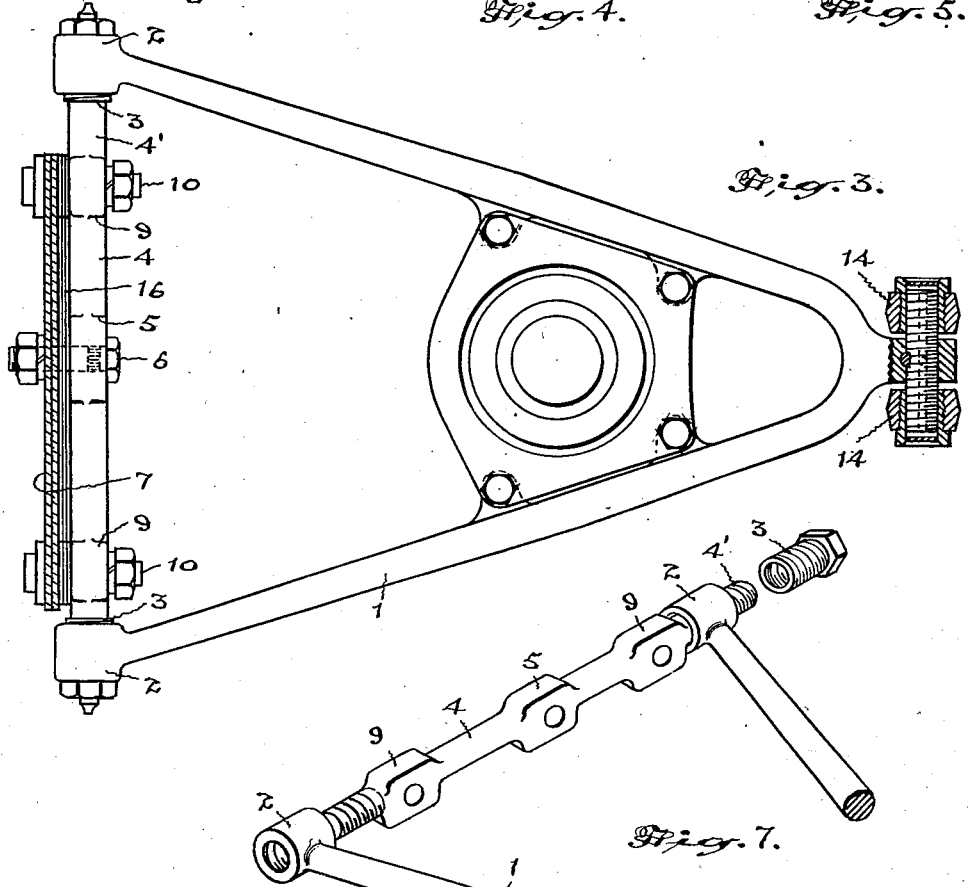

Patented Oct. 19, 1937

2,096,118

UNITED STATES PATENT OFFICE 2,096,118

INDEPENDENT WHEEL SUSPENSION

John Wycliffe Leighton, Port Huron, Mich.

Original application November 20, 1933, Serial No. 698,846. Divided and this application March 15, 1937, Serial No. 130,878

19 Claims. (Cl. 267—20)

The principal objects of this invention are to provide an improved form of mounting for independent wheel suspension which will not only ensure the true alignment of the pivotal suspension arm bearings, but which will further greatly facilitate the assembly and mounting of such a mechanism.

The principal feature of the invention resides in the novel construction and arrangement of parts whereby the inner horizontally spaced ends of the suspension arm are oscillatably journalled on a common unitary mounting bar which is adapted to be adjustably secured to the vehicle chassis.

A further and important feature resides in the novel construction of the unitary mounting bar with or without threaded bearing ends and in its special corelation to the rigidly spaced ends of the suspension arm to be journalled thereon whereby the bar may be readily inserted into journalled bearing relation with the respective ends of said arm.

A further feature of importance resides in the novel manner of adjustably supporting the unitary arm-mounting bar on the vehicle chassis whereby said bar, together with the suspension arm mounted thereon, may be rotatably adjusted over a limited angle about an axis disposed transversely of the longitudinal axis of the vehicle chassis and may also be adjusted toward or away from said longitudinal axis to vary the relation of the outer end of said arm to said longitudinal vehicle axis.

In the accompanying drawings, Figure 1 is a plan view of a wheel suspension assembly illustrating the present invention applied thereto.

Figure 3 is a part sectional plan view of the lower forked suspension arm with its adjustable pivot bar support on the car frame.

Figure 4 is a side elevational view partly in section of the adjustable mounting means for the suspension arm and showing one of the bearing bosses of the arm in section, together with the inserted bearing bushing.

Figure 5 is a cross sectional view taken on the line 5—5 of Figure 4 showing one of the adjustable slot and bolt connections between the arm-supporting bar and the frame.

Figure 6 is a side elevational sectional view through the rigidly spaced arm bosses showing the unitary supporting pivot bar being inserted into position through one of the bosses.

Figure 7 is a perspective view showing the unitary supporting bar partly inserted and aligned with the axes of the respective arm bosses.

Figure 8 is a view similar to Figure 6, but showing the short end of the unitary supporting bar threaded directly into its adjacent arm boss and showing the opposite first-inserted end supported within the opposite arm boss by means of an inserted bushing.

Figure 1:
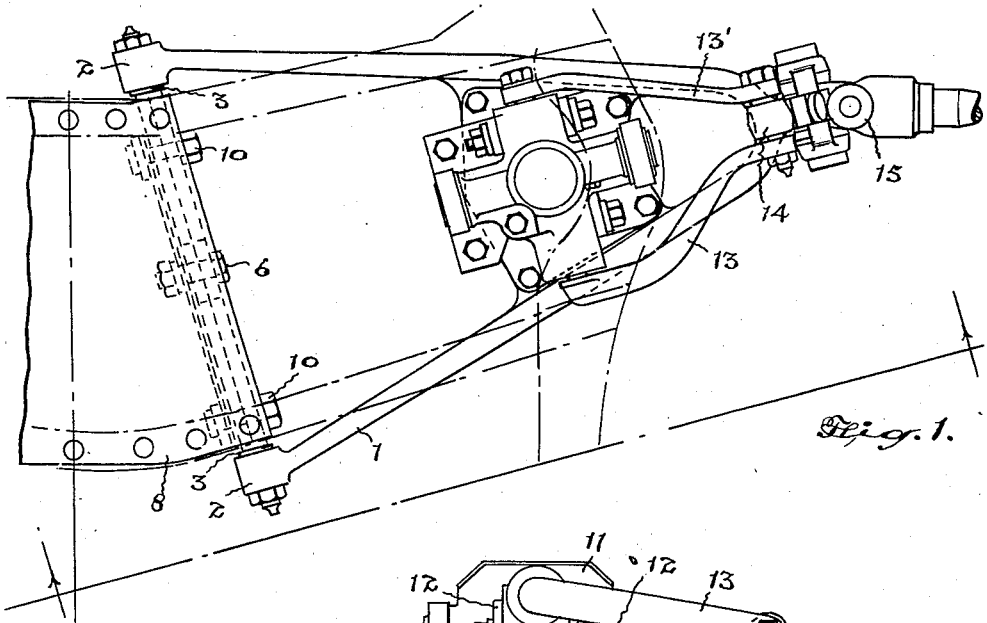
Figure 2:
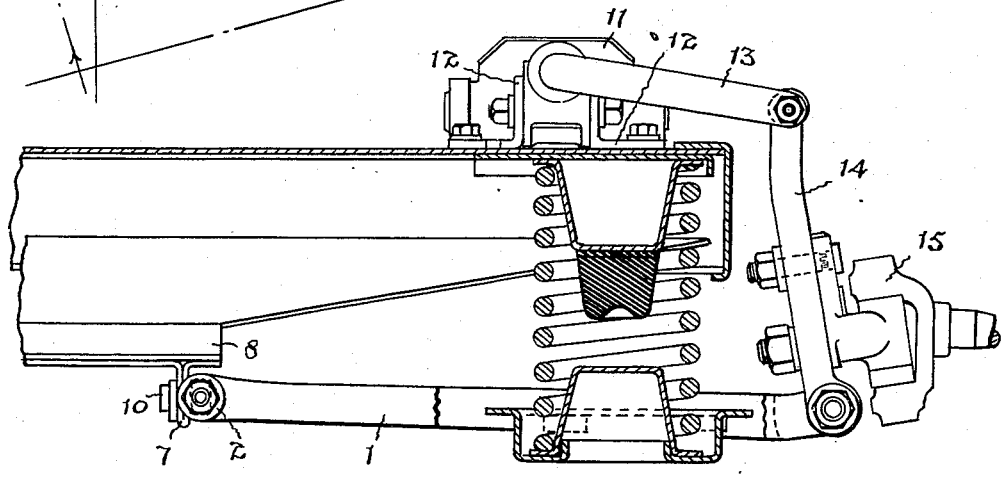
Figure 2 is a part sectional front elevational view of the wheel suspension assembly.
Figure 9:
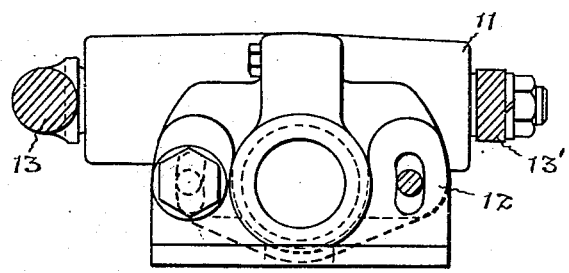
Figure 9 is an enlarged end elevational part sectional view of the shock absorber associated with the upper arm and the adjustable mounting therefor.

This application is a division of my co-pending application Serial No. 698,846, filed November 20, 1933, and relates more particularly to improved constructional and assembly features relative to the mounting of the inner end of the suspension arm.

Referring in detail to the illustrated showing of the invention, the lower forked or "wishbone" arm 1 of the suspension assembly, which is of substantially rigid form and preferably comprises a unitary forging or malleable casting, is here shown provided with internally threaded bosses 2 into which threaded bearing bushings 3 are adapted to be threaded.

A unitary bar mounting member 4 is provided which may also comprise a single forged length of bar stock and the ends of this bar are preferably threaded to engage in bearing contact with the inner threaded surfaces of the bushings 3 so that the rigid forked arm 1 is oscillatably supported on the ends of the single bar 4.

The bar 4 is shown bossed at 5 midway of its length to receive a mounting bolt 6 which is adapted to extend through a bracket 7 or other suitable portion of the vehicle chassis 8 and apertured bosses 9 are provided on the bar 4 adjacent to each end thereof, one being preferably arranged farther from one end than is the other to provide a longer end portion 4' and so that the distance from its outward side to the opposite end extremity of the bar is preferably slightly less than the distance between the inner faces of the arm bosses 2.

It is important to note that the threaded orifice in the arm boss 2, which receives the longer free end portion 4' of the bar, is provided with an orifice sufficiently large that when the bushing 3 thereof is removed the longer portion 4' of the bar may be easily entered into the said arm boss at an acute angle to the axis thereof and may be moved axially within the said boss a sufficient distance to permit the opposite end extremity of the bar to clear the inner side of the opposite arm boss 2, whereupon the bar may be brought into axial alignment with the said latter boss and then entered thereinto, after which the respective bushings 3, which are preferably of the self-locking threaded type, may be threaded into place, thereby retaining the arm 1 in assembled bearing relation to the bar 4. On reference to Figures 6, 7 and 8, it will be noted that this feature of assembly may be readily carried out without the necessity of providing a second bushing, since it is only necessary to provide a bushing in the arm boss which co-operates with the longer free end portion of the bar 4, as illustrated particularly in Figure 6, so that once the bar is inserted and aligned with the orifices as shown in Figure 7, the bar may then be directly threaded or inserted into the orifice of one arm boss, after which the longer free end portion of the bar may be retained in the other boss by the bushing as indicated in Figure 8.

It is of course desirable to maintain the end bosses 9 as close as is possible to the supporting bosses 2 of the arms when in assembled position and the portion 4' need only be of sufficient length to permit clearance of the opposite end extremity past the inner face of the adjacent arm boss before the boss 9 adjacent the portion 4' contacts with the inner face of the opposite arm boss 2 during insertion, as indicated in Figure 6.

Mounting bolts 10 are provided which extend through the apertured bosses 9 and through slots 10' in the bracket 7 so that the bar 4 may be rotatably adjusted over a limited angle about the axis of the bolt 6 and then locked firmly in place.

A shock absorber device 11 is shown mounted on the vehicle chassis above the arm 1 in an adjustable manner by means of the bracket 12 and this shock absorber is shown provided with a control arm 13 which extends outwardly in substantially parallel relation to the lower arm 1 and a mating arm 13' extends outwardly from the shock absorber device and these arms 13 and 13' converge toward their outer end as do also the forked portions of the lower arm 1 and are connected respectively in a pivotal manner, preferably by adjustable threaded bearings such as described in my prior applications 695,412, (now Patent 2,076,852), or 746,152 (now Patent 2,077,844) or 711,506, to the top and bottom of an upright connecting bar 14 to which the king pin and wheel support assembly 15 are adapted to be adjustably mounted in the manner set forth in the said co-pending application.

It will be noted that by rotatably adjusting the bar 4 in the manner defined the lower arm 1 may be accurately adjusted to prevent binding of the pivotal joints and to ensure proper assembled alignment thereof and this adjustment may be harmonized with the adjustment of the shock-absorber device on the frame to accomplish slight variations in the angular inclination of the connecting bar 14 and at the same time ensure proper alignment of the pivot axes, thereby avoiding binding and strain on the parts and it is to be further observed that shims 16 are provided which are adapted to be inserted between the bracket 7 and the mounting bar 6, the functions of which are to compensate for any slight discrepancies or variations in the manufacture of the parts which would tend to introduce a slight error in the desired accurate positioning of the outer end of the arm 1, or the angular inclination of the bar 14 and it is to be noted that by inserting more or less shims at this location, the actual effective length of the arm 1 may be varied relative to the longitudinal centre line of the vehicle chassis, which in turn will effect a variation in the angular inclination of the upright arm-connecting bar 14 providing slight adjustment of "camber" of the king pin axis.

It will thus be seen that although the construction is extremely simple it is capable of accurate adjustment to suit varying conditions encountered in assembly and service and the single unitary bar 4 forms a very desirable rugged support for the inner end of the arm 1 and it co-operates with both of the spaced lugs 2 thereof and it is impossible for the bearing portions of the bar 4 to become mis-aligned, setting up destructive binding forces as would be the case where the opposite lugs or bosses 2 were supported on individual pivot bolts as has been heretofore proposed and the special relation of the bar 4 to the arm bosses defined herein makes possible the use of a single unitary mounting bar for both spaced portions of the rigid arm 1.

Many structural variations may be made in carrying the present invention into effect without departing from the essential spirit of the invention and I may in certain cases dispense with the actual threaded bearing connection between the unitary bar 4 and one or both of the arm bosses 2 and may substitute therefor plain bearing surfaces, while retaining the advantages of assembly and mounting defined in connection with the unitary bar mounting, but the threaded bearing features in the particular environment claimed present distinct features of advantage due to the extensive bearing surfaces of the threads which ensure against axial play and looseness in the fore and aft direction and moreover the severe thrusts set up due to braking on the front wheels, will be distributed over the extensive bearing areas presented by the numerous shoulder formations of the threaded journal connections, thereby avoiding excessive local strain and wear as is experienced in present structures where only small bearing areas are available against axial thrusts.

What I claim as my invention is:—

1. In an independent wheel suspension, the combination with the vehicle frame, of a rigid unitary bar mounted on said frame in offset relation to the longitudinal centre line thereof and having the ends forming bearings surfaces, and a wheel suspension assembly extending from the frame including a forked arm having spaced ends journalled respectively on the free ends of said bar, at least one end of said bar and the arm end journalled thereon being of threaded formation and engaging in threaded bearing contact.

2. In an independent vehicle wheel suspension, the combination with the vehicle frame, of a rigid unitary bar mounted on said frame and having the opposite ends threaded, and a wheel suspension assembly flexibly connected with the frame including arms having threaded bearing engagement with the respective threaded ends of said bar.

3. In an independent vehicle wheel suspension, a frame joint for the lower control arm thereof, comprising a bar adapted to be rigidly secured to the vehicle frame, said bar having ends formed with bearing surfaces, said control arm having spaced-apart ends adapted to receive the bearing portions of said bar, bushings having bearing surfaces to engage the bearing surfaces of said bar ends and external surfaces to fit into the said arm ends, and means for securing said spaced-apart arm ends on said bushings.

4. In an independent wheel suspension, a frame joint for the lower control arm thereof, comprising a bar adapted to be rigidly secured to the vehicle frame having ends formed with bearing surfaces and having fixed mounting bosses spaced from said bearing ends, said arm having bearing ends spaced apart a distance greater than the distance from one end of said bar to the outer side of the boss farthest therefrom so that one bearing end of the arm may slip over one end of the bar and permit the other bearing end of the arm to embrace the opposite end of the bar.

5. In an independent vehicle wheel suspension, a hinged joint for the lower forked arm thereof, comprising a bar rigidly secured to the vehicle frame having ends formed with bearing surfaces, an arm having spaced-apart ends, one of said ends adapted to receive and pass one of the bearing portions of said bar, a bushing having an internal bearing surface to engage the said received bearing surface of the end of said bar and having an external surface to fit into said arm end, and means for securing said arm end on said bushing, the other of said arm ends having an internal bearing surface to engage the bearing surface of the other end of said bar.

6. In an independent wheel suspension the combination with the vehicle frame and a wheel suspension assembly extending from the frame including paired arms presenting spaced inward extremities for pivotal connection with the frame, of a unitary mounting for both of said paired arms comprising a single rigid bar to be pivotally associated with both of said arms and apertured at spaced points in its length for the reception of fastening bolts, and fastening bolts extending through said apertures and securing said bar rigidly to the frame.

7. Means as claimed in claim 6 in which a member of the frame is slotted to adjustably receive said fastening bolts and provide for adjustment of said bar relative to the frame.

8. An independent vehicle wheel suspension, comprising the combination with the vehicle frame, of a member pivotally adjustable on said frame and having threaded bearing extremities, means for locking said pivotal member in adjusted positions, a bifurcated arm having its inner ends encircling the threaded ends of the pivotal member and supported thereon by a threaded bearing surface, a king pin support hinged freely to the outer end of said bifurcated arm, means flexibly supporting the other end of said hinged king pin support, a wheel axle mounted on said king pin, and spring means interposed between the vehicle frame and said bifurcated arm.

9. An independent vehicle wheel suspension, comprising the combination with the vehicle frame, of a bar secured to said frame and arranged in acute angular relation to the centre line of the frame and having threaded bearing ends, threaded bushings mounted on said threaded bearing ends, a bifurcate arm housing said threaded bushings and supported thereby from said bar and extending outwardly beyond the vehicle frame, a member freely hinged to the outer end of said bifurcated arm and extending upwardly therefrom, means freely hinged to the upper end of said latter member and connected with the frame, a compression spring interposed between said bifurcated arm and the frame, a king pin supported from the member hinged to said bifurcated arm, and a wheel axle mounted on said king pin.

10. An independent vehicle wheel suspension comprising the combination with a vehicle frame, of a bearing member adjustably mounted on said frame, an arm member hinged to said bearing member and adjustable in unison with said bearing member, a king pin support hinged freely to the outer end of said arm member, means flexibly and adjustably supporting the other end of said king pin support, a king pin mounted on said support, a wheel axle connected with said king pin, and spring means interposed between the vehicle frame and said arm.

11. An independent vehicle wheel suspension comprising a vehicle frame, a bar adjustably mounted on the frame and extending substantially in a fore and aft direction thereof, an arm pivotally mounted on said bar and extending outwardly beyond the frame, a compression spring between said arm and said frame, a member hinged to the outer end of said arm and extending upwardly, a shock absorber device mounted on said frame, an arm extending from said shock absorber device and hinged to the upper end of the member hinged to the aforesaid arm, a king pin assembly mounted on said upwardly extending member, and a wheel axle carried by said king pin.

12. Means as claimed in claim 11 in which said shock absorber device is adjustably mounted on the frame whereby it is adjustable to compensate for adjustments made in the position of the adjustably mounted bar, to avoid strain or binding in the hinge joints.

13. An independent vehicle wheel suspension comprising a bar disposed substantially in the fore and aft direction of the vehicle frame and mounted on the frame for pivotal adjustment in a substantially vertical plane, a bifurcated arm pivotally mounted on the ends of said bar, an upright member having the lower end hinged to the outer end of said bifurcated arm, said hinged connection having threaded bearing surfaces, a threaded bolt secured in the upper end of said upright member, arms having threaded bearing surfaces engaging in threaded bearing contact with the ends of said threaded bolt and extending inwardly toward the frame, a shock absorbing device connected with said arms and mounted on the frame, a compression spring introduced between the frame and said bifurcated arm, a king pin mounted on said upright member, and a wheel axle mounted on said king pin.

14. In an independent wheel suspension wherein a wheel suspension assembly extends from the frame including a unitary forked arm having substantially rigid arm extremities, a unitary mounting for said arm extremities comprising a length of bar having boss portions spaced from the ends and bearing extremities on which the respective arms of the fork are adapted to be journalled, one of said bearing extremities being of sufficiently greater length than the other to permit it to be inserted in its respective arm from the inward side a distance to permit the entry of the other bearing end of the bar into the other arm of the fork, said boss portions of the bar being apertured for the reception of fastening bolts.

15. Means as claimed in claim 14 in which at least one end of said bar is threaded for threaded bearing engagement with the arm, the first mentioned arm of the rigid fork having an enlarged orifice for the initial easy entry of the longer bearing end of said bar and having a bushing secured therein and presenting intimate bearing contact with the said longer end of the bar.

16. Means as claimed in claim 11 in which shims are inserted between the said mounting bar and the frame member for the purpose of adjustably positioning the outer end of the said arm and/or varying the effective length thereof relative to the longitudinal centre line of the vehicle chassis and whereby variations in the angular position of said king pin support may be effected and/or the "camber" altered.

17. A unitary mounting for the inner spaced ends of the forked arm of a vehicle wheel suspension, comprising a unitary length of bar to be secured to the vehicle frame having threaded bearing surfaces at the opposite ends to oscillatably support the said spaced ends of the forked arm in threaded bearing engagement.

18. As an article of manufacture, an integral forged mounting bar for independent wheel suspension, said bar having a central boss and bosses spaced therefrom and from the ends thereof, leaving free bearing end portions therebeyond, said bosses being apertured, the aperture of said central boss being adapted to receive a mounting bolt about which the bar is adapted to be adjustably rocked and the apertures of the end bosses being for the reception of clamping bolts to lock the bar in adjusted positions.

19. A bar for mounting a forked vehicle suspension arm having threaded bearing surfaces at the ends and laterally projecting mounting means adjacent the ends for securing said bar to the vehicle, the threaded bearing surface at one end terminating immediately adjacent the respective mounting means and the threaded bearing surface at the other end being spaced a substantial distance from the respective mounting means and adapted to initially receive one end of said forked vehicle arm and whereby the end projecting farthest from its mounting means will not be unduly weakened.

JOHN WYCLIFFE LEIGHTON.